United States Patent
Koda

(10) Patent No.: US 9,473,680 B2
(45) Date of Patent: Oct. 18, 2016

(54) IMAGING DEVICE WITH A ROTATABLE DISPLAY

(71) Applicant: Sony Corporation, Minato-ku (JP)

(72) Inventor: Yuta Koda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/938,722

(22) Filed: Jul. 10, 2013

(65) Prior Publication Data

US 2014/0055657 A1    Feb. 27, 2014

(30) Foreign Application Priority Data

Aug. 27, 2012  (JP) .................................. 2012-186234

(51) Int. Cl.
*H04N 5/222* (2006.01)
*H04N 5/225* (2006.01)
*H04N 5/232* (2006.01)

(52) U.S. Cl.
CPC ........ *H04N 5/2252* (2013.01); *H04N 5/23293* (2013.01)

(58) Field of Classification Search
None
See application file for complete search history.

(56) References Cited

U.S. PATENT DOCUMENTS

| | | | | |
|---|---|---|---|---|
| 7,433,722 B2* | 10/2008 | Sakamoto | ............. | H04M 1/021 348/E5.128 |
| 2004/0132482 A1* | 7/2004 | Kang et al. | ................ | 455/550.1 |
| 2005/0044665 A1* | 3/2005 | Kuramochi | ........... | G06F 1/1616 16/341 |
| 2005/0190291 A1* | 9/2005 | Kota | .................. | H04M 1/0237 348/376 |
| 2006/0039691 A1* | 2/2006 | Yamada | ................ | G03B 15/05 396/178 |
| 2007/0223792 A1* | 9/2007 | Morimoto | .......... | G06K 9/00033 382/126 |
| 2010/0238119 A1* | 9/2010 | Dubrovsky | ........... | G06F 1/1626 345/169 |
| 2012/0293942 A1* | 11/2012 | Moser | .................. | G06F 1/1616 361/679.26 |
| 2013/0141857 A1* | 6/2013 | Sano | ....................... | 361/679.27 |

* cited by examiner

*Primary Examiner* — Aung S Moe
*Assistant Examiner* — Euel Cowan
(74) *Attorney, Agent, or Firm* — Chip Law Group

(57) ABSTRACT

There is provided an imaging device including an imaging device body, a hinge connected to the imaging device body, and a display part provided on the imaging device body slidably and turnably through the hinge.

19 Claims, 11 Drawing Sheets

A

B

A

B

A

B

A

B

A

B

C

D

IMAGING DEVICE WITH A ROTATABLE DISPLAY

BACKGROUND

The present technology relates to an imaging device.

There is an imaging device in which a display for displaying a subject that is an imaging object when performing imaging can be adjusted to an arbitrary angle by a user.

For instance, an imaging device for which quality on an appearance is improved by allowing smooth opening and closing of a display while making a gap between a vari-angle display and an imaging device body as small as possible is known (refer to Japanese Patent Laid-Open No. 2009-017421).

SUMMARY

However, in the imaging device described in the Japanese Patent Laid-Open No. 2009-017421, the display is opened only up to about 90°. As an imaging device with a display that can be opened up to about 90°, the imaging device with the display that can be opened and closed for imaging at a low angle is also known, but the one that can be easily opened up to about 180° is demanded.

Therefore, it is desirable to provide an imaging device having a structure in which a display part is easily turnable up to about 180° without sacrificing design.

According to an embodiment of the present technology, there is provided an imaging device including an imaging device body, a hinge connected to the imaging device body, and a display part provided on the imaging device body slidably and turnably through the hinge.

Further, the imaging device may include a base body connected to one end side of the hinge. The display part may be slid on the base body. The imaging device body may further include a protective part with which an end portion of the display part is to be in sliding contact when the display part is turned. The display part may be slid on the base body by the end portion being in sliding contact with the protective part. The imaging device body may have an inclined surface inclined with respect to an outer surface of the display part before being turned, and the protective part is provided on the inclined surface. The imaging device may further include an abutting part to be abutted to an end face of the protective part.

Further, it is preferable that a turning center of the hinge is uniaxial, a sandwiching part which sandwiches a shaft of the hinge so as to have friction, or the hinge is extendable.

According to the present technology, since the display part is turnable and slidable, the imaging device with the display part that can be easily opened up to about 180° can be provided. Further, according to the present technology, since the display part can be opened up to about 180° by a simple structure, there is no need of incorporating a large hinge or the like, and the imaging device for which the design is not sacrificed can be provided.

DETAILED DESCRIPTION OF THE EMBODIMENTS

Figure 1:
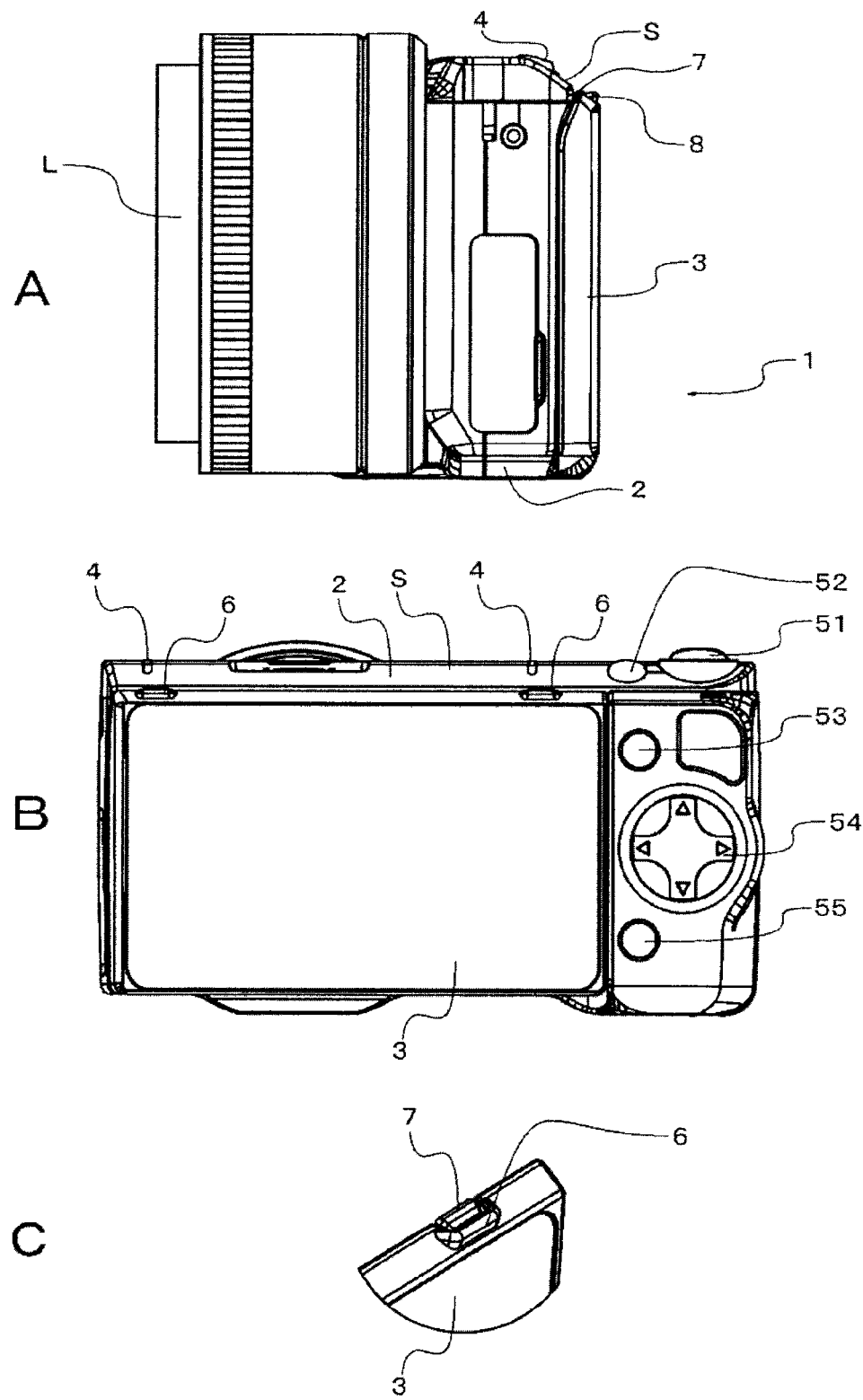
FIG. 1A is an outline view illustrating an initial state of one embodiment of the imaging device according to the present technology.
FIG. 1B is a plan view from a display part side in FIG. 1A.
FIG. 1C is a partial enlarged perspective view of a display part illustrated in FIG. 1A and FIG. 1B.

Note that, in this specification and the appended drawings, structural elements that have substantially the same function and structure are denoted with the same reference numerals, and repeated explanation of these structural elements is omitted.

Hereinafter, an embodiment of the present technology will be described with reference to the drawings. Note that, the present technology is not limited only to the embodiment described below. Description will be made in the following order.

<1. Embodiment>
[1-1. Definition of terms]
[1-2. Configuration of imaging device]
[1-3. Shifting operation to self-imaging possible state]
<2. Modification and application>
<1. Embodiment>
[1-1. Definition of Terms]

First, before describing a configuration of an imaging device according to the present technology, terms to be used in this specification will be defined.

"Imaging" means that an imaging element receives light indicating an image and converts it into electric signals in an imaging device. Also, "image frame" means the entire area imaged by an effective area of the imaging element or an area slightly smaller than the entire area. "Self-imaging" is that a user turns a lens of the imaging device to himself/herself and images himself/herself as a subject. Also, the subject of self-imaging is not limited to the user alone and there is also a case that a plurality of persons including the user are the subject. Further, "initial state" is a state in which a display part is not turned or slid and the user can perform normal imaging facing the subject.

[1-2. Configuration of Imaging Device]

FIG. 1 is a drawing illustrating one embodiment of the imaging device according to the present technology.

As illustrated in FIG. 1A, an imaging device 1 includes an imaging device body 2, a display part 3, and a hinge (not shown in FIG. 1). The imaging device body 2 and the display part 3 are connected through the hinge. Also, the hinge will be described later together with descriptions of a shifting operation to a self-imaging possible state. FIG. 1B is a plan view of the imaging device 1 from the side of the display part 3 in FIG. 1A. FIG. 1C is a partial enlarged view of the display part 3 illustrated in FIG. 1A and FIG. 1B.

The imaging device body 2 is formed into roughly a rectangular parallelepiped shape, and a circuit for performing signal processing according to an appropriate operation or the like is provided in the inside. The imaging device body 2 includes a protective part 4, operation buttons 51, 52, 53, 54 and 55, and a lens unit L.

To the operation buttons 51-55, various functions are allocated respectively according to a state of the imaging device 1. Allocation of the various functions to the respective operation buttons is not specially limited, and for instance, functions of automatic focus, detection instruction for subject detection, release instruction input, ON/OFF of a power source, changeover of an imaging mode, zoom magnification changeover, movement of a selection item on a screen displayed at the display part 3, ON/OFF of flash, and a shutter, etc., may be appropriately allocated.

For instance, when the functions of automatic focus, detection instruction for subject detection and a release instruction input are allocated to the operation button 51, the function to be operated is separated according to a way of depressing the operation button 51. For instance, setting can be performed so as to input detection instruction by depressing the operation button 51 halfway, that is, by turning the operation button 51 to a half-depressed state, and to input release instruction by completely depressing the operation button 51, that is, by turning the operation button 51 to a fully depressed state.

The protective part 4 provided on a surface of the imaging device body 2 is a ridge-like part forming a projected shape, and is formed so as to increase a height from the side of the lens unit L to the side of the display part 3, that is, from the left side to the right side in FIG. 1A. The protective part 4 is provided on an inclined surface S forming a part of the imaging device body 2, which is a surface inclined relative to an end face such as an outer surface of the display part 3 before being turned, in other words, a screen of the display part 3 in the initial state. The embodiment of providing the protective part 4 on the inclined surface S is preferable because the design of the entire imaging device 1 is not sacrificed since a projection on the surface of the imaging device body 2 is inconspicuous compared to the form of providing the protective part 4 on an end face which is not the inclined surface.

The display part 3 is roughly in a planar shape, and is attached to the imaging device body 2 slidably and turnably with respect to the imaging device body 2 through the hinge. The display part 3 includes a member for displaying various images such as an LCD (Liquid Crystal Display), a PDP (Plasma Display Panel), or an organic EL (Electro Luminescence) panel, on a surface to face the user during imaging in the initial state of the imaging device 1. The display part 3 is a member for making the user view various kinds of information. As the information displayed at the display part 3, a through image, an image obtained by imaging and a user interface image, etc., can be given as examples.

The display part 3 has a finger hooking part 6 and a sliding contact part 7. FIG. 1C is a partial enlarged view illustrating the finger hooking part 6 and the sliding contact part 7 of the display part 3. The finger hooking part 6 is a projection formed such that the user can hook a finger for the purpose of inclining the display part 3 in order to perform imaging while confirming the through image at a high angle. The sliding contact part 7 is a part to be in sliding contact with the protective part 4 when performing a turning operation of the display part 3 described later, and is formed as a projection. The finger hooking part 6 and the sliding contact part 7 may be attached to the display part 3 as respectively independent members or may be integrally molded with a resin molding formed so as to surround the screen of the organic EL panel or the like.

The protective part 4 of the imaging device body 2 and the sliding contact part 7 of the display part 3 will be described later together with descriptions on the shifting operation to the self-imaging possible state and the hinge.

[1-3. Shifting Operation to Self-Imaging Possible State]

In the imaging device 1 illustrated in FIG. 1, the display part 3 can be turned upwards up to about 180° from the initial state illustrated in FIG. 1A. Normal imaging is possible in the initial state of the imaging device 1, and self-imaging is easily possible in the state of turning the display part 3 up to about 180°. A turning method of the display part 3 in the imaging device 1 and actions thereof will be described below with reference to FIGS. 2-6.

Figure 2:
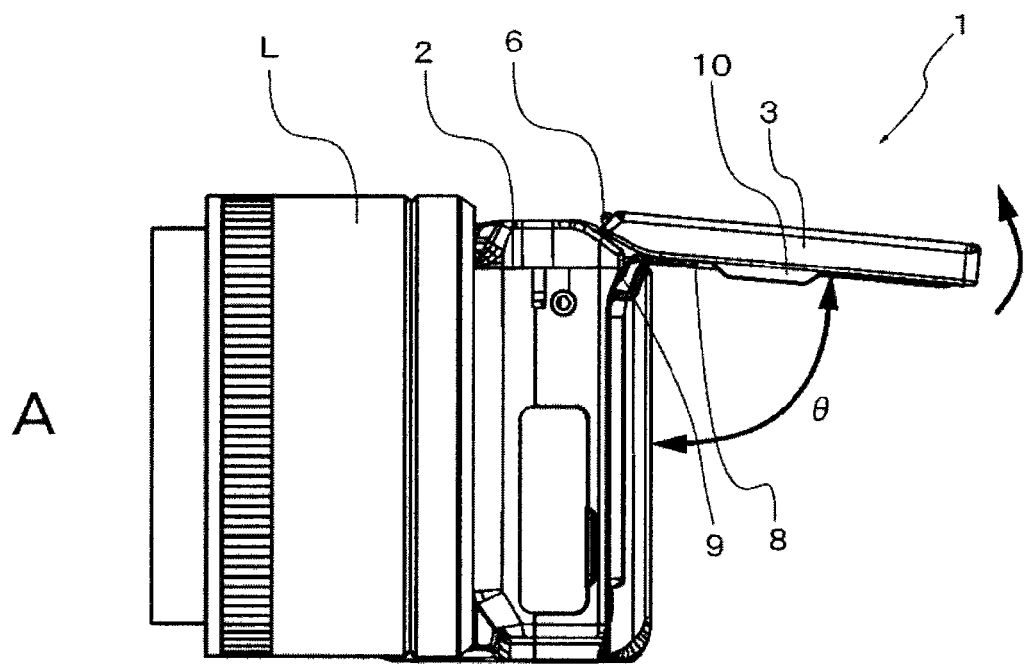
FIG. 2A is an outline view illustrating one example of the imaging device with a turned display part.
FIG. 2B is a partial enlarged view of FIG. 2A.
Figure 2:
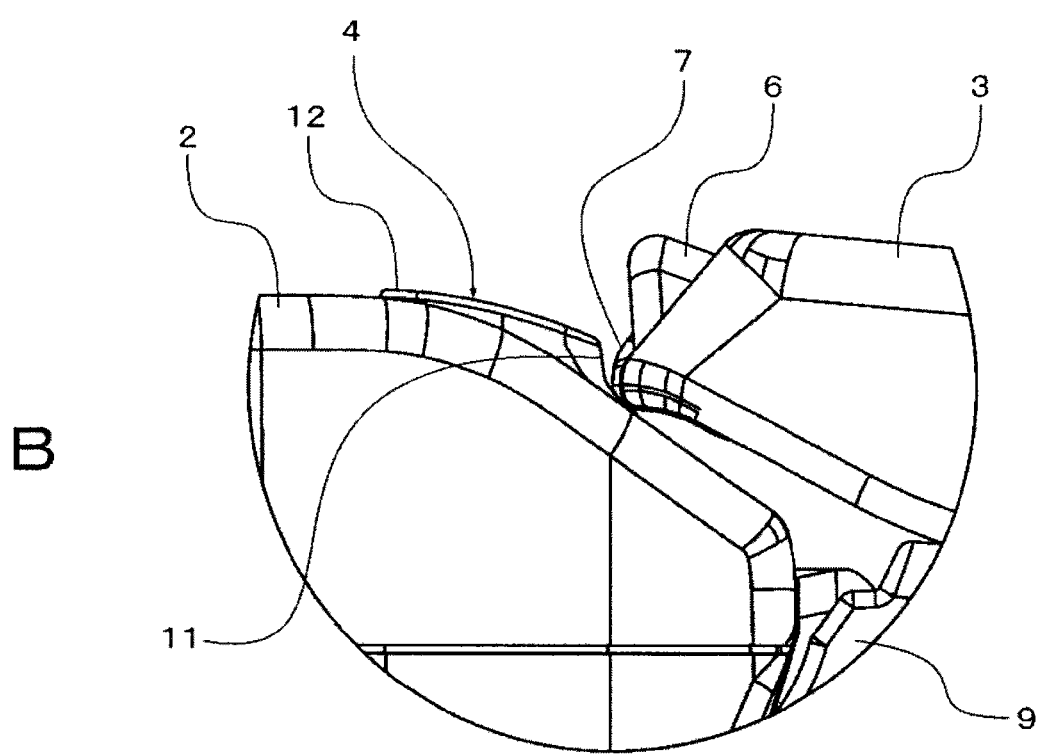

First, the display part 3 is turned as illustrated in FIG. 2. A turning angle of the display part in this specification is an angle θ formed by an imaging device body end face at a part where the display part is stored in the initial state and an end face of the turned display part when observing the imaging device from a side face as in FIG. 1A and FIG. 2A. The turning angle of the imaging device 1 illustrated in FIG. 2 is about 90°. By turning the display part 3 up to about 90°, generally up to about 80°-90°, as in the imaging device 1 illustrated in FIG. 2, imaging is made possible while confirming the through image at a low angle.

As illustrated in FIG. 2A, the imaging device body 2 and the display part 3 are connected by a hinge 8. Also, on an inner side of the hinge 8, an abutting part 9 is provided. The abutting part 9 will be described later with reference to FIGS. 4 and 5. One end portion of the hinge 8 is turnably attached to a connection part 10 formed at a part not provided with the screen of the display part 3, and the other end portion of the hinge 8 is attached as a turning center of the display part 3 near the protective part 4 inside the imaging device body 2. Since one end portion of the hinge 8 is turnably attached to the connection part 10, the display part 3 can be inclined when performing imaging at a high angle.

As illustrated in FIG. 2B, when the display part 3 is turned up to about 90°, the protective part 4 of the imaging device body 2 and the sliding contact part 7 of the display part 3 are brought into contact. In detail, the protective part 4 has a raised part 11 and a smooth part 12. The raised part 11 is a part erected from the surface of the imaging device body 2, and the maximum height part of the raised part 11 becomes a part most separated from the surface of the imaging device body 2 in the protective part 4. Also, the smooth part 12 is a part extending from one end portion of the raised part 11 so as to be merged with the surface of the imaging device body 2, and is gentle and smooth. Thus, in the state illustrated in FIG. 2B, the raised part 11 of the protective part 4 in the imaging device body 2 and the sliding contact part 7 of the display part 3 are in contact.

The protective part 4 is preferably formed of such a material that it is not broken even when pressurized by the sliding contact part 7 of the display part 3. The material of the protective part 4 can be, for instance, a resin molding, ceramics or a metal. However, the imaging device body 2 and the protective part 4 may be formed as separate members and assembled, or the imaging device body 2 and the protective part 4 may be formed by integral molding of a resin for instance.

Even in the past, when the display part was turned up to about 90°, an end portion of the display part was brought into contact with the imaging device body. However, in the past, it was difficult to turn the display part 90° or more as long as the end portion of the display part was in contact with the imaging device body. That is, since a part of the imaging device body was included in a turning track of the end portion of the display part, it was difficult to turn the display part up to about 180° due to interference of the display part with the imaging device body.

In the past, when making the display part turnable up to about 180°, there was no other alternative but to adopt a form of using a hinge of a large turning radius. Also, in the past, a form of reducing the end portion of the display part interfering with the imaging device body and applying a hinge structure used in a portable phone or the like or a form of using a biaxial hinge whose turning center is biaxial or the like was adopted.

However, the form of using the biaxial hinge was complicated as a structure of the imaging device. Further, in the case of turning up to about 180° from the initial state and in the case of returning to the initial state from the state of turning up to about 180°, an operation of just performing turning was not sufficient and a specific turning method was demanded. That is, the structure of the imaging device was complicated and steps of turning operations were increased compared to the case of simply performing turning with a uniaxial hinge. Further, in the form of using the hinge of the large turning radius or a hinge used in the portable phone or the like, it was difficult to avoid enlargement of the imaging device itself and the exposure of an exterior division line due to the mechanism of the hinge or the like. That is, by making the display part turnable up to about 180°, design of the imaging device was sometimes sacrificed.

Figure 3:
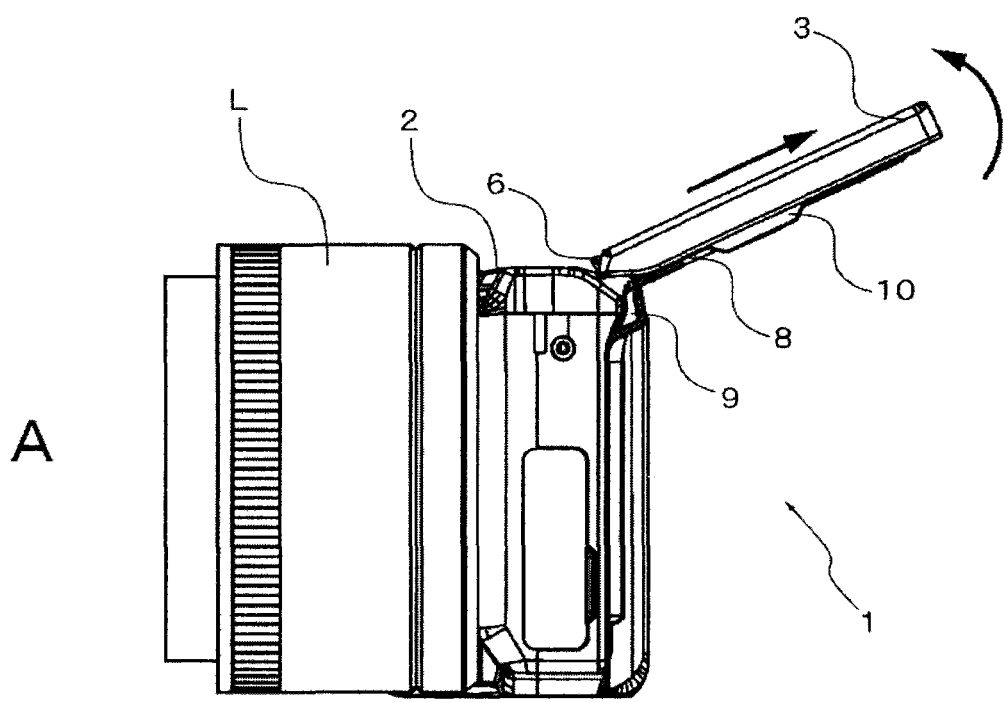
FIG. 3A is an outline view illustrating one example of the imaging device with the turned display part.
FIG. 3B is a partial enlarged view of FIG. 3A.
Figure 3:
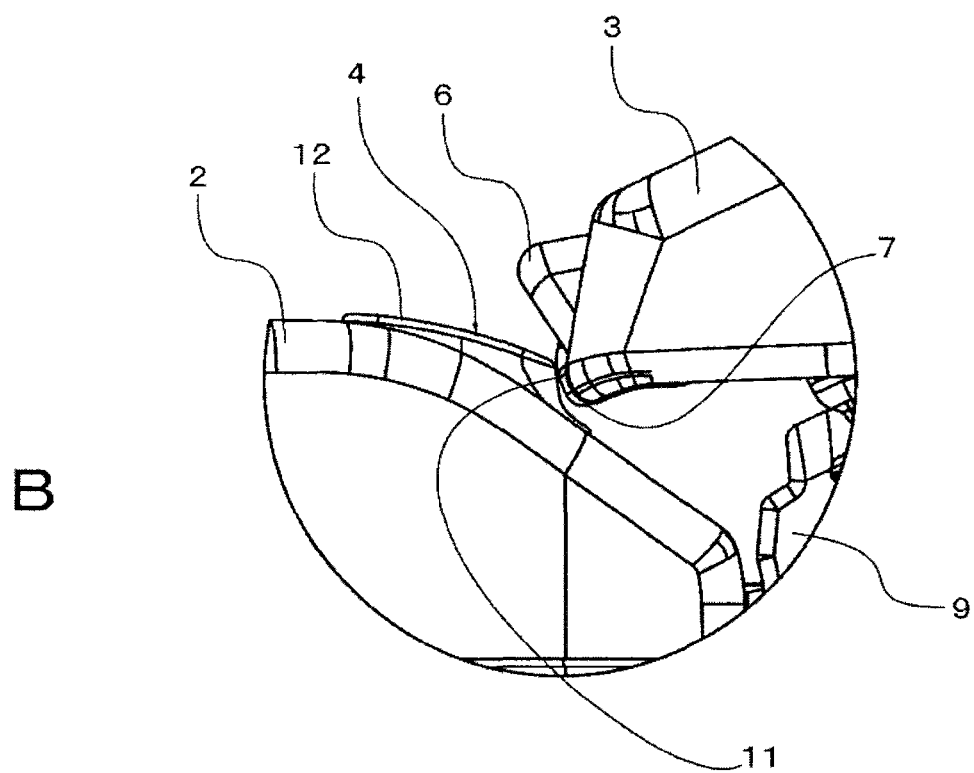

In the imaging device 1, unlike past examples, the display part 3 can be easily turned exceeding a turning angle of about 90° as illustrated in FIG. 3. Specially as illustrated in FIG. 3B, when the display part 3 is turned exceeding the turning angle of about 90°, the sliding contact part 7 of the display part 3 pressurizes the raised part 11 of the protective part 4. Since the protective part 4 of the imaging device body 2 is formed so as not to be broken even when pressurized by the sliding contact part 7 of the display part 3, pressurizing force which acts on the protective part 4 from the sliding contact part 7 is converted to force in the direction of pushing back the sliding contact part 7 by the protective part 4 as it is by reaction. When the sliding contact part 7 receives the force in the direction of being pushed back from the protective part 4, since the display part 3 is slidable, the display part 3 is slid in the direction of separating from the imaging device body 2. Near the display part 3 in FIG. 3A, a sliding direction of the display part 3 is indicated as a straight arrow on the side where a screen is provided, and a turning direction of the display part 3 is indicated by a curved arrow. Further, in the imaging device according to the present technology, an uniaxial hinge whose turning center is uniaxial can be used without the need of incorporating a complicated mechanism such as a biaxial hinge.

When the display part 3 is turned exceeding the turning angle of about 90°, since the protective part 4 is not broken even when pressurized by the sliding contact part 7, as illustrated in FIG. 3B, the sliding contact part 7 is brought into sliding contact with the surface of the protective part 4 so as to get on the raised part 11 of the protective part 4.

Figure 4:
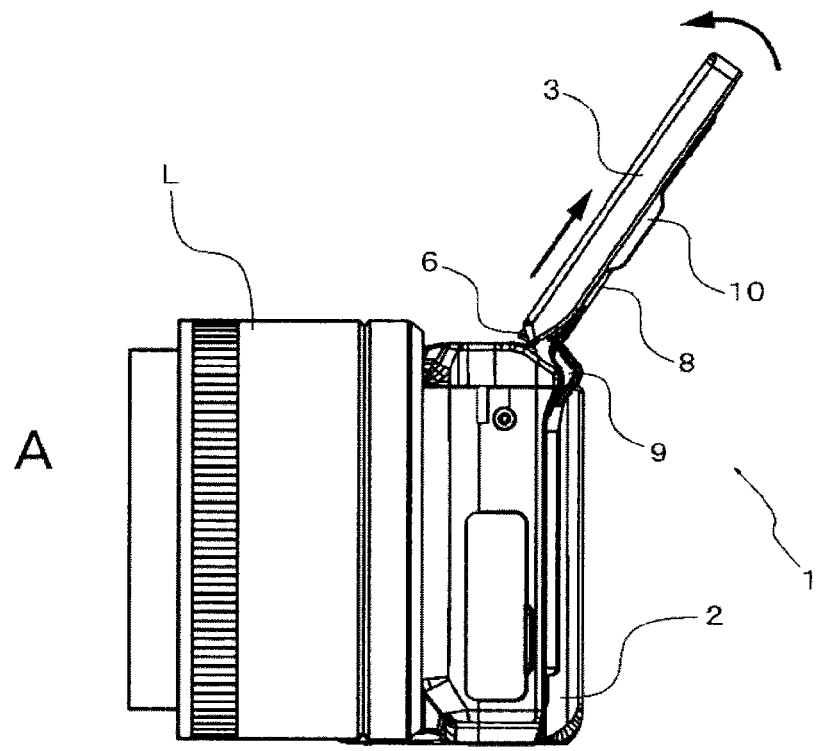
FIG. 4A is an outline view illustrating one example of the imaging device with the turned display part.
FIG. 4B is a partial enlarged view of FIG. 4A.
Figure 4:
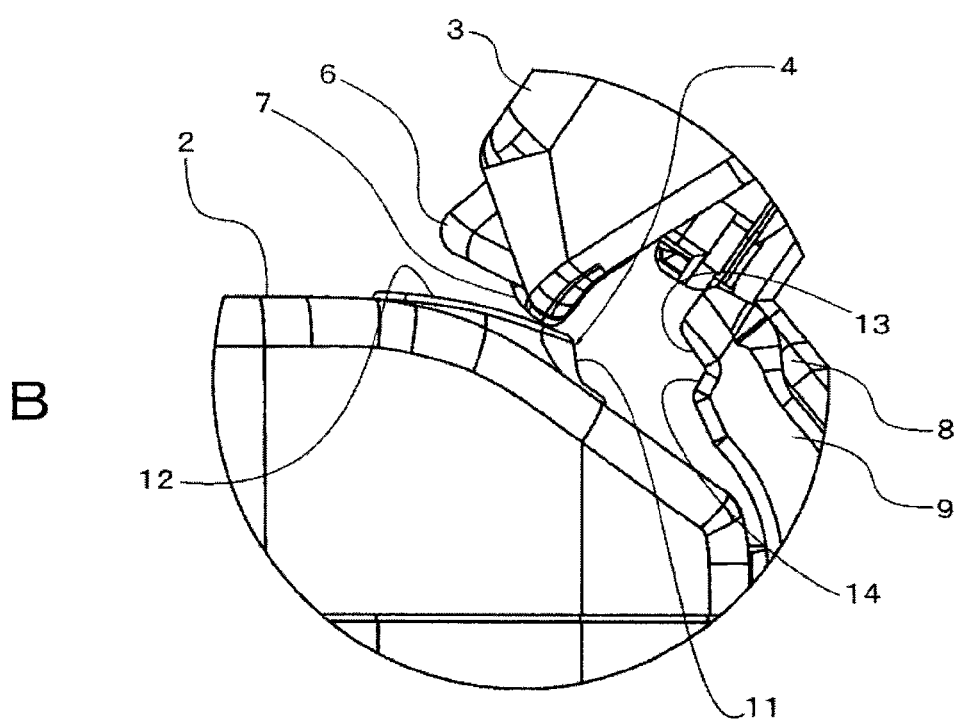

When the display part 3 is turned further from the state illustrated in FIG. 3, the imaging device 1 is turned to the state illustrated in FIG. 4. Specially as illustrated in FIG. 4B, the sliding contact part 7 of the display part 3 is brought into sliding contact with the raised part 11 of the protective part 4 and is then brought into sliding contact with the smooth part 12. Even in the state illustrated in FIG. 4, by the turning of the display part 3, the sliding contact part 7 continuously pressurizes the protective part 4 similarly to the state illustrated in FIG. 3. Also, the action of the display part 3 is similar to the description of the state illustrated in FIG. 3 mentioned above. That is, pressurizing force which acts on the protective part 4 from the sliding contact part 7 is turned to force in the direction of pushing back the sliding contact part 7 by the protective part 4 as it is by reaction. When the sliding contact part 7 receives the force in the direction of being pushed back from the protective part 4, the display part 3 is slid further from the state illustrated in FIG. 3 in the direction of separating from the imaging device body 2.

The abutting part 9 is a member abutted to an end face of the protective part 4. Specifically, the abutting part 9 is attached on the inner side of the hinge 8, and includes a turning angle regulation part 13 and a pressurization regulation part 14. The turning angle regulation part 13 is a part which regulates the turning angle at the turning completion of the display part 3, that is, a part which determines a completion position of the turning operation of the display part 3. Also, the pressurization regulation part 14 is a part which is pressed to the raised part 11 of the protective part 4 when the display part 3 is turned up to about 180° and a user tries to turn the display part 3 to the side of the lens unit L further in the state that the turning is completed. That is, when the force applied upon the turning operation of the display part 3 acts on the imaging device body 2 from the display part 3, the pressurization regulation part 14 and the raised part 11 become the part to receive the force. It is preferable that the abutting part 9 is formed of a hard material so as to withstand the force applied to the turning operation of the user.

Figure 5:
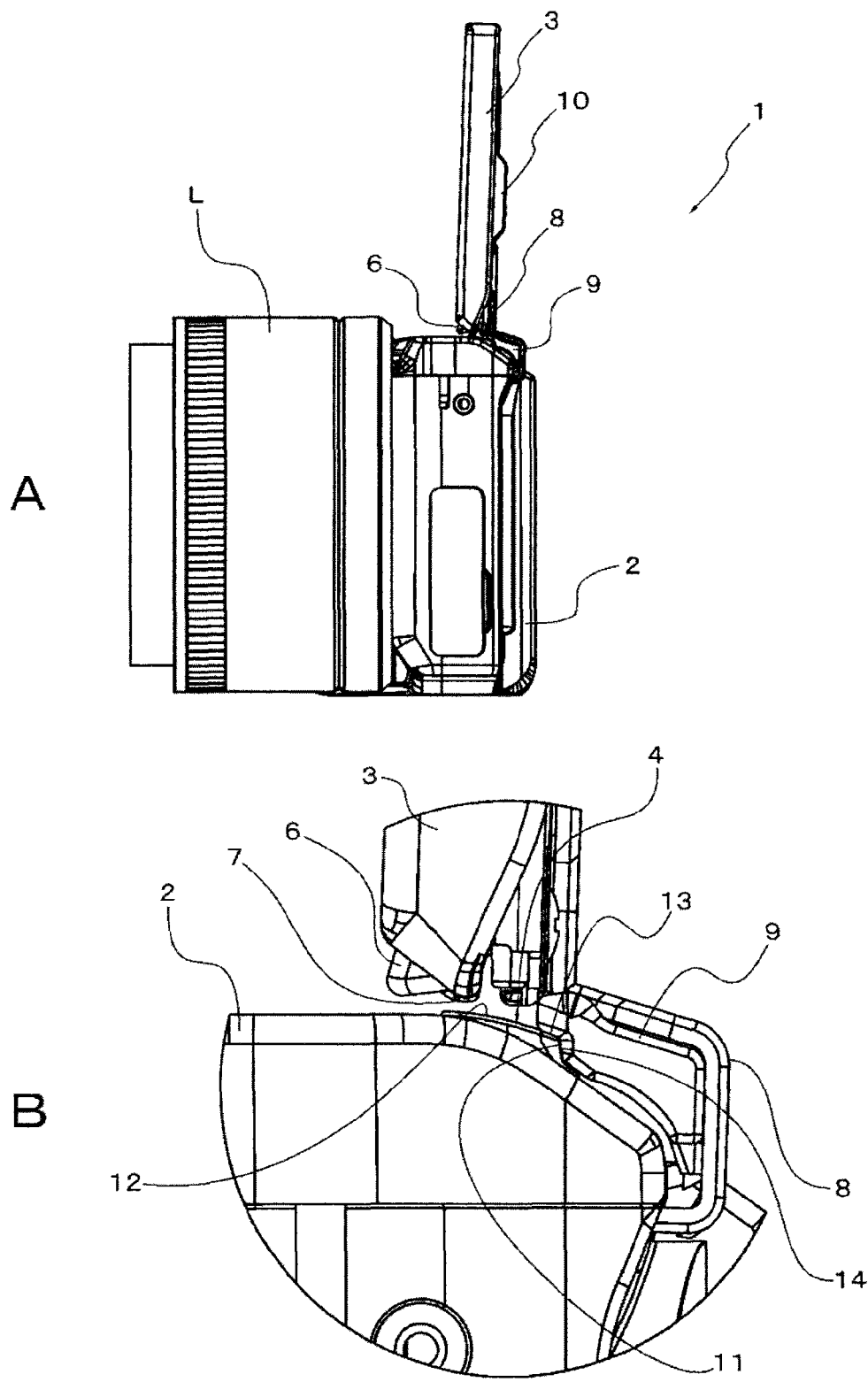
FIG. 5A is an outline view illustrating one example of the imaging device with the turned display part.
FIG. 5B is a partial enlarged view of FIG. 5A.

The imaging device 1 illustrated in FIG. 5 is in the state that the turning angle of the display part 3 reaches about 180°. In the imaging device 1, when the turning angle of the display part 3 reaches about 180°, the abutting part 9 is abutted to the end face of the protective part 4, that is, the raised part 12 of the protective part 4. Furthermore, at the point of time when the turning operation of the display part 3 is completed, which is illustrated in FIG. 5, the turning angle regulation part 13 of the abutting part 9 is abutted to the smooth part 12 of the protective part 4, and the pressurization regulation part 14 of the abutting part 9 is abutted to the raised part 12 of the protective part 4.

An angle at which the turning operation of the display part 3 is completed can be determined according to an acute angle of the angles formed by the turning angle regulation part 13 and the pressurization regulation part 14. Thus, in the imaging device according to the present technology, while the turning angle of the display part when performing self-imaging is set at about 180°, when setting the turning angle at 190° for instance, the acute angle of the angles formed by the turning angle regulation part 13 and the pressurization regulation part 14 may be reduced.

Also, when a user erroneously tries to turn the display part 3 toward the side of the lens unit L further even though the turning operation of the display part 3 is completed, force that the display part 3 pressurizes the imaging device body 2 to the side of the lens unit L acts. However, since the pressurization regulation part 14 is abutted to the raised part 12, the hard-to-break protective part 4 receives the pressurizing force, and the display part 3 is prevented from being turned exceeding about 180°.

Figure 6:
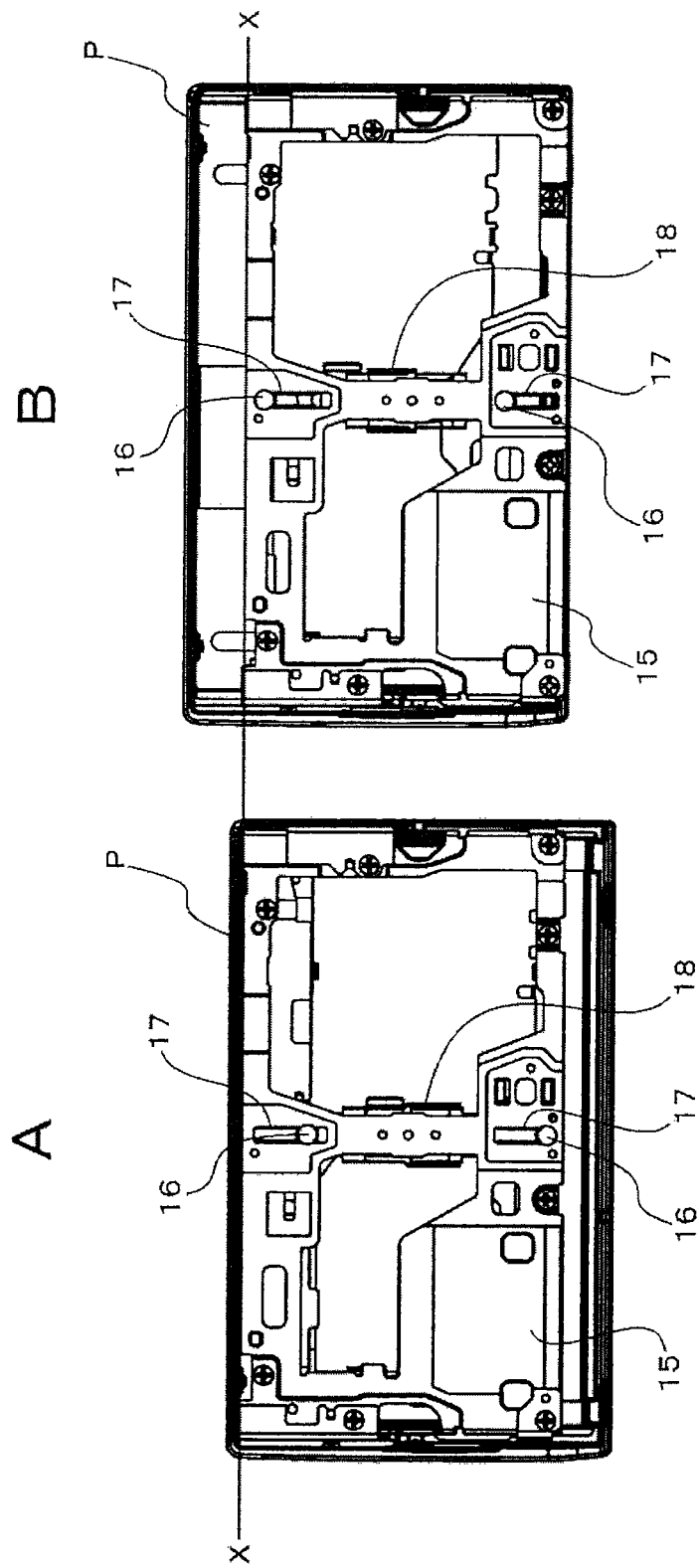
FIG. 6A is a schematic view illustrating the display part before being slid.
FIG. 6B is a schematic view illustrating the display part after being slid.

In FIG. 6, a base body 15 provided in the imaging device 1 and a planar base plate P which remains after removing a screen such as an organic EL panel in the display part 3, various kinds of electric circuits and a resin molding that surrounds the periphery or the like are illustrated. The base body 15 is connected on a side opposite to one end side of the hinge 8 illustrated in FIGS. 2-5, in other words, the side connected to the imaging device body 2 of the hinge 8, and the display part 3 is slid on the base body 15. FIG. 6A illustrates the base plate P before being slid and the base body 15, and FIG. 6B illustrates the base plate P after being slid and the base body 15. In FIG. 6, a reference line X is indicated so as to traverse FIG. 6A and FIG. 6B so that it is easy to discriminate a moving distance of a movable part of the base plate P or the like before and after sliding of the display part 3.

The base plate P of the display part 3 has a projection part 16, and the base body 15 has a slit 17. The projection part 16 is engaged with the slit 17 without a gap, and the projection part 16 is slidable inside the slit 17. A direction of the slit 17 determines a sliding direction of the display part 3, and a length in a long axial direction of the slit 17 determines a slidable range of the display part 3. It is preferable that, since the projection part 16 is engaged with the slit 17 without a gap, backlash is not generated in the initial state and sliding operation of the display part 3.

Also, an elastic member 18 is attached to the almost center part of the base body 15. The elastic member 18 is a member which generates elastic force when the display part is shifted from the initial state illustrated in FIG. 6A to the state illustrated in FIG. 6B, that is, when the display part is shifted from the state before being slid to the state after being slid. When shifting from the state illustrated in FIG. 6B to the initial state illustrated in FIG. 6A, the elastic force may be generated and may not be generated. As the elastic member 18, specifically, a leaf spring, a spring and an air spring or the like may be appropriately selected for instance.

When the elastic member 18 generates the elastic force when the display part 3 is shifted from the initial state illustrated in FIG. 6A to the state illustrated in FIG. 6B, it is preferable in that the backlash is not generated in the initial state of the display part 3. Further, it is also preferable in that the display part is not easily slid even when an operation is performed with a finger on the screen in the slidable direction when the screen of the display part is a touch panel or the like.

Further, when the elastic member 18 generates the elastic force when the display part 3 is shifted from the state before being slid to the state of starting to be slid, the force which is necessary when turning the display part 3 is changed in the middle of turning. In detail, when turning the display part 3, the force of turning the display part 3 which is necessary when the sliding contact part 7 starts to be in sliding contact with the raised part 11 has to be larger than the force of turning the display part 3 which is necessary until the sliding contact part 7 of the display part 3 is abutted to the protective part 4 of the imaging device body 2. That is, when starting to slide the display part 3, the display part 3 has to be turned against the elastic force of the elastic member 18. Since a user easily discriminates that the display part 3 starts to shift from the state immediately before being slid, that is, the state capable of imaging at a low angle, to the self-imaging possible state by the magnitude of the force which is necessary for turning the display part 3, contribution is made to operability improvement of the imaging device 1.

The turning method of the display part 3 in the imaging device 1 and its action are described as above with reference to FIGS. 2-6. In the imaging device 1, since the display part 3 is slid by the protective part 4 and the sliding contact part 7 or the like just by turning the display part 3, the display part 3 can be easily turned up to about 180° without falling into an unturnable state due to interference of the display part 3 and the imaging device body 2. Since the force of turning the display part 3 is converted to the force of sliding the display part 3 while turning it, the user may not have to be conscious of sliding the display part 3, and thus the self-imaging possible state is attained by a simple operation.

<2. Modification and Application>

Figure 7:
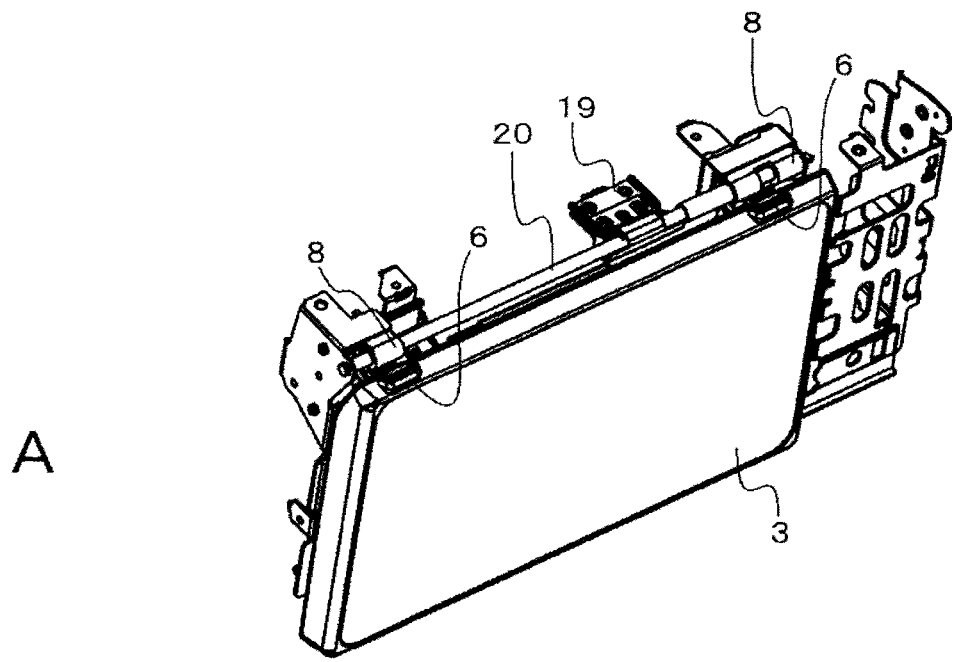
FIG. 7A is a perspective view illustrating one example of a sandwiching part attached to the imaging device according to the present technology.
FIG. 7B is a partial enlarged view of FIG. 7A.
Figure 7:
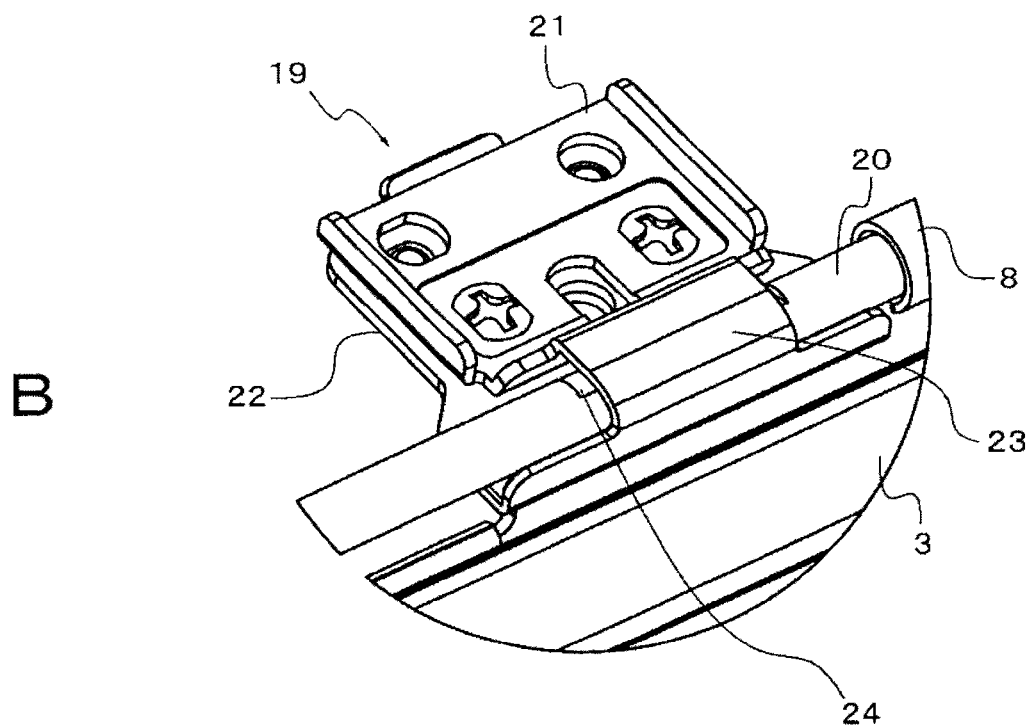
Figure 8:
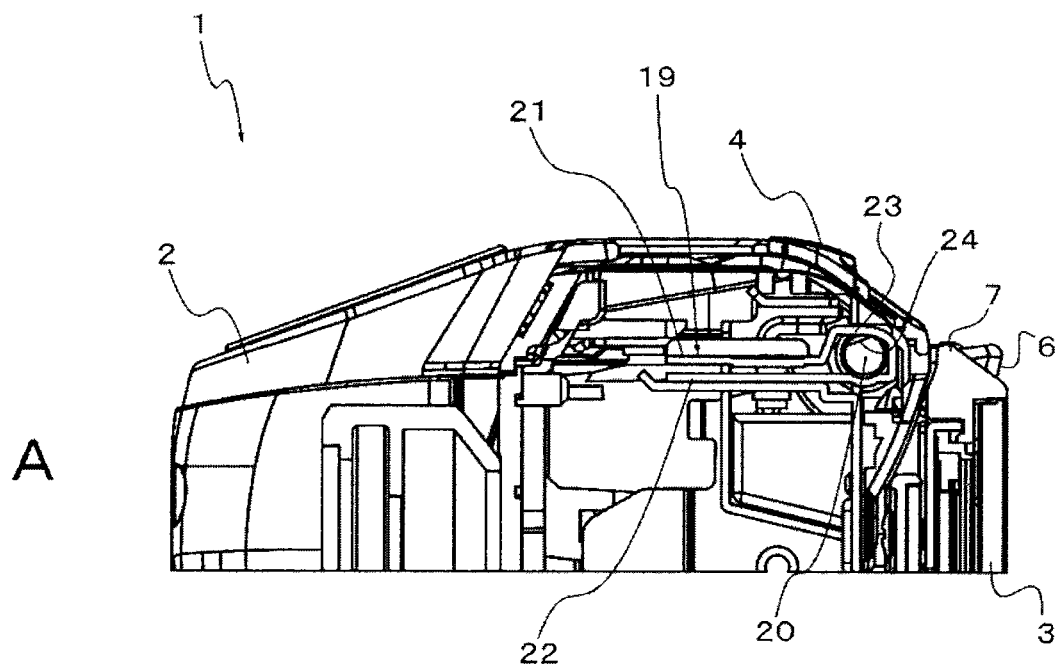
FIG. 8A is a sectional view illustrating one example of the imaging device before turning the display part.
FIG. 8B is a sectional view illustrating one example of the imaging device after turning the display part.
Figure 8:
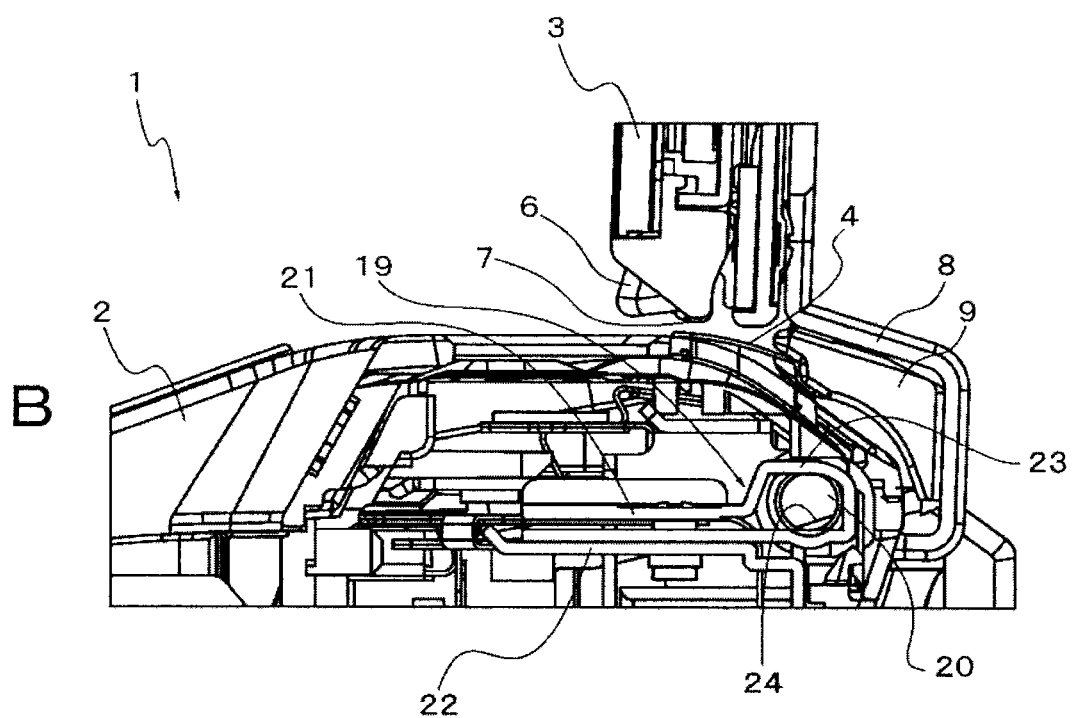

In the imaging device according to the present technology, a sandwiching part 19 as illustrated in FIGS. 7 and 8 for instance can be attached. Since the members other than the sandwiching part 19 illustrated in FIGS. 7 and 8 indicate the same members in the embodiment illustrated in FIGS. 1-6, detailed descriptions of the respective members are omitted.

As illustrated in FIG. 7A, the sandwiching part 19 sandwiches a turning shaft 20 of the hinge 8 so as to have friction. The sandwiching part 19 is fixed inside the imaging device body 2 illustrated in FIG. 1. The sandwiching part 19 is enlarged and illustrated in FIG. 7B. The sandwiching part 19 includes an upper plate 21, a lower plate 22, and a surrounding part 23. The surrounding part 23 surrounds the turning shaft 20 while being in contact, and the upper plate 21 and the lower plate 22 are connected through the surrounding part 23 with a fixing member such as a machine screw. Since the sandwiching part 19 is provided such that the upper plate 21 and the lower plate 22 sandwiches the turning shaft 20 therebetween, when the display part 3 is turned, the display part is fixed at the position and the turning angle is kept without returning to the initial state by the deadweight of the display part 3 even when the turning force is removed.

Further, as illustrated in FIGS. 7 and 8, a notched part 24 is formed at a part of the turning shaft 20 of the hinge 8 to be in contact with the surrounding part 23. The imaging device 1 in the initial state is illustrated in FIG. 8A, and the imaging device 1 in the state of turning the display part 3 up to about 180° is illustrated in FIG. 8B. As illustrated in FIG. 8, the upper side of the surrounding part 23 when a center axis of the lens unit L of the imaging device 1 is turned horizontal is formed flat, and the lower side of the surrounding part 23 is curved and formed so as to be partially projected to the outer side.

As illustrated in FIG. 8A, in the imaging device 1 in the initial state, the notched part 24 of the turning shaft 20 and a flat part of the surrounding part 23 are arranged so as to roughly face each other. By such arrangement of the notched part 24 and the surrounding part 23, when returning the display part 3 from a turned state to the initial state, pull-in force for the display part 3 to naturally return to the position of the initial state is generated when the turning angle becomes as small as about 5° to 10°. Thus, it is preferable that the operability of the display part 3 is improved since the notched part 24 and the flat part of the surrounding part 23 roughly face each other in the initial state. Further, since the state of slightly turning the display part 3, the state that the turning angle is about 5° for instance, is not maintained, the display part 3 can be prevented from being forgotten to be returned or the like.

Also, in the imaging device 1 in the state of turning the display part 3 for self-imaging as illustrated in FIG. 8B, the notched part 24 and a curved part of the surrounding part 23 are arranged so as to roughly face each other. If the curved part of the surrounding part 23 in FIG. 8B is formed flat, there is the possibility that the pull-in force in the direction of reducing the turning angle is generated when the display part 3 is turned up to about 180°. By arranging the curved part at the surrounding part 23, the pull-in force is not generated even when the display part 3 is turned up to about 180°, and since the sandwiching part 19 sandwiches the turning shaft 20 so as to have friction, the turning angle of about 180° can be maintained.

Figure 9:
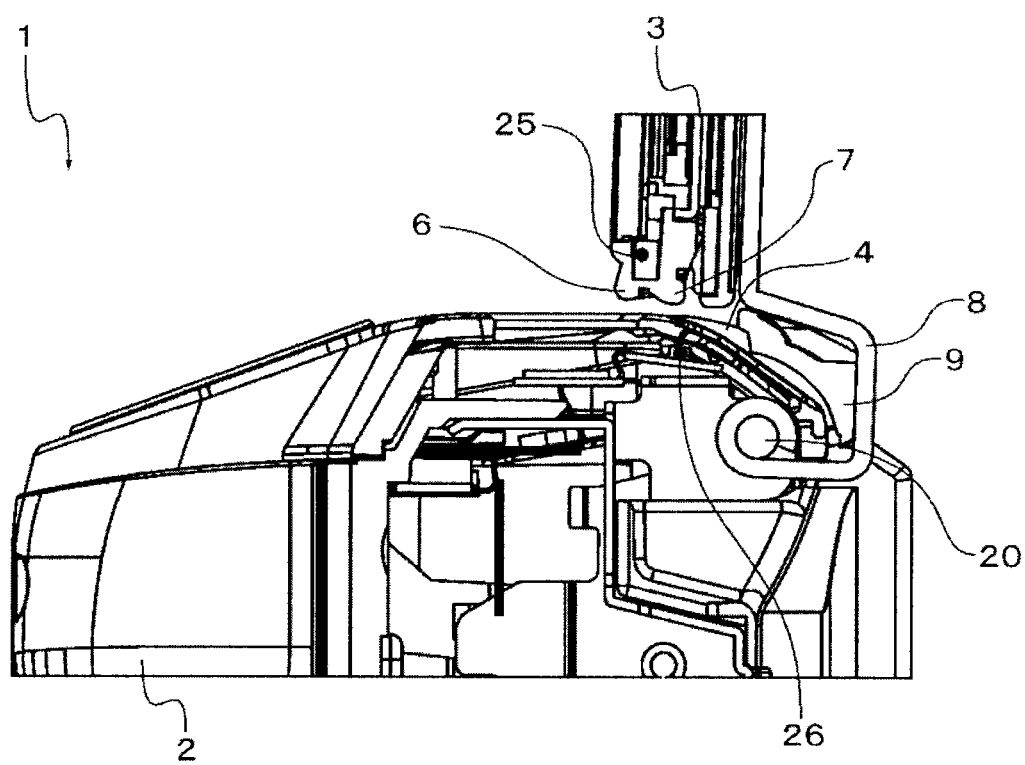
FIG. 9 is a sectional view illustrating a turning completion state of another embodiment of the imaging device according to the present technology.

Subsequently, the embodiment capable of detecting turning of about 180° will be described with reference to FIG. 9. As illustrated in FIG. 9, a magnet 25 is arranged inside the finger hooking part 6 and the sliding contact part 7 in the display part 3. Also, an MR sensor 26 is arranged inside the imaging device body 2 so as to be positioned near the magnet 25 when the display part 3 is turned up to about 180°. Thus, when the display part 3 is turned up to about 180° for self-imaging, the MR sensor 26 can electrically detect turning completion in reaction to a magnetic field of the magnet 25.

Also, as functions that can be added to the embodiment illustrated in FIG. 9, there are, for instance, a function of inverting an image displayed at the display part 3 so as to be easily recognized by a user when the MR sensor 26 detects the turning completion of the display part 3, and a function of linking a self-timer function for self-imaging when the MR sensor 26 detects the turning completion of the display part 3, etc.

In the embodiment described above, while the sliding contact part, the protective part, the hinge and the abutting part are arranged so as to match the positions of the respective members during turning and after turning, the arrangement of the members are not limited as long as the sliding contact part, the protective part and the abutting part are provided on corresponding positions.

For instance, the sliding contact parts may be provided on both end sides of a long side part in the display part, one abutting part may be provided on the almost center part of the long side part, and three protective parts may be further provided on positions corresponding to the sliding contact parts and the abutting part on the imaging device body. When the respective members are arranged so as to match the positions as in the embodiment described above, it is preferable since the design of the entire imaging device is improved.

In the embodiment described above, since the protective part provided on the imaging device body receives all the force acting on the imaging device body from the display part, contribution is made to reduction of the number of components, miniaturization of the imaging device and improvement of the design of the entire imaging device, etc.

Even though the sliding contact part to be in sliding contact with the surface of the protective part is not an necessary member in the imaging device according to the present technology, it is preferable since the display part to be in contact with the protective part during turning is not to be scratched.

In the imaging device according to the present technology, when the end portion of the display part interferes with the imaging device body, since the end portion of the display part is brought into sliding contact with the protective part when the display part is turned, the display part is slid while being turned. In a specific embodiment, as illustrated in FIGS. 1-5, by the sliding contact part 7 of the display part 3 being in sliding contact so as to go over the raised part 11 of the protective part 4, the display part 3 is slid while being turned. A shape of the protective part may be a ridge-like shape having the raised part 11 and the smooth part 12 illustrated in the drawing or may be a single projected shape not having the smooth part or the like.

The imaging device according to the present technology can easily shift from the state capable of demonstrating an appropriate function of the imaging device to the state capable of demonstrating a different function. A shift from the state capable of imaging at a low angle to the state capable of self-imaging, a shift from the state capable of imaging at a high angle to the state capable of self-imaging, and a shift from the state capable of imaging at a low angle to the state capable of imaging at a high angle, etc., are examples.

Figure 10:
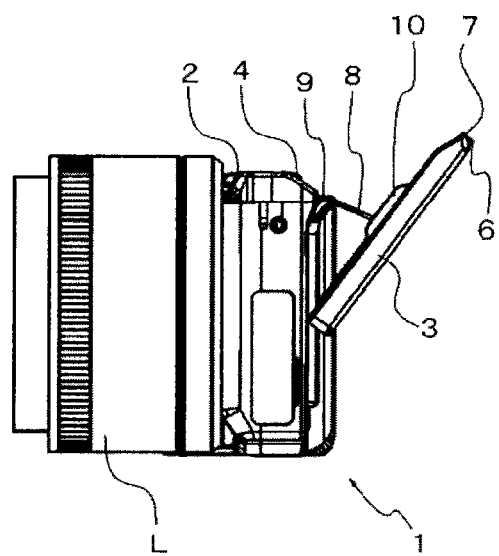
FIGS. 10A-10D are operation process drawings shifting from a state capable of imaging at a high angle to a state capable of self-imaging.
Figure 10:
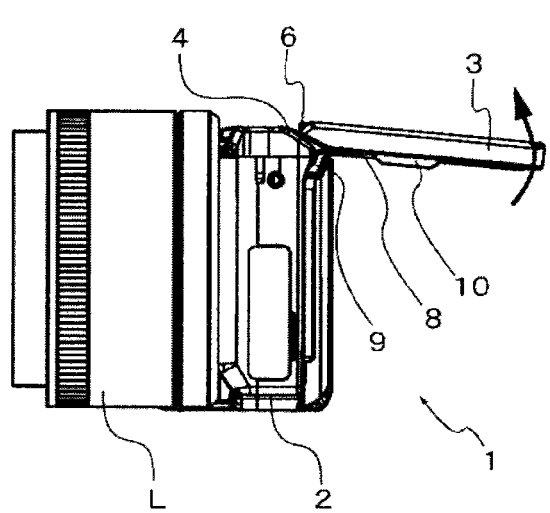
Figure 10:
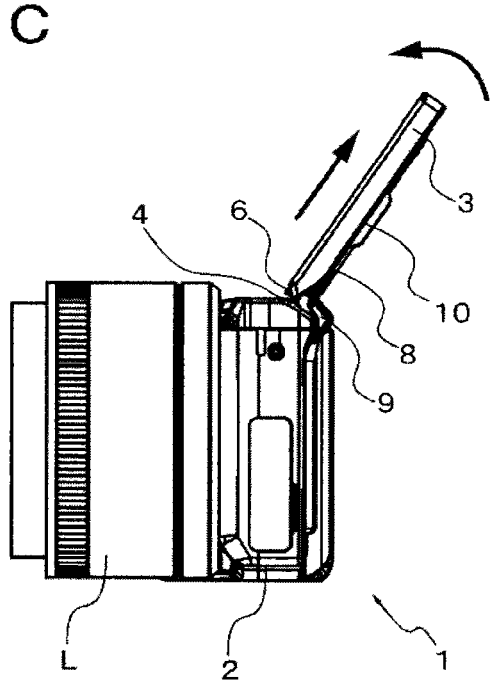
Figure 10:
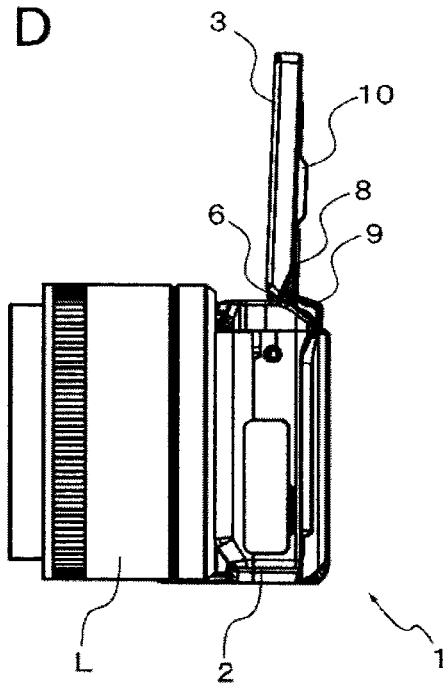

FIG. 10 is a side view of the imaging device 1 in the case of shifting from the state of inclining the display part 3 for imaging at a high angle to the state of turning the display part 3 for self-imaging.

FIG. 10A is the imaging device 1 in the state of inclining the display part 3 for imaging at a high angle. In order to turn the display part 3 to the state illustrated in FIG. 10A, after hooking a finger to the finger hooking part 6 of the display part 3 turned up to about 90° in the imaging device 1 illustrated in FIG. 2, the part where the finger hooking part 6 is provided may be pulled out to the front to incline the display part 3. Though it is not illustrated in detail in the drawing, it is preferable that the display part 3 and the hinge 8 are connected so as to have a certain amount of friction at the connection part 10. It is preferable when the display part 3 and the hinge 8 are connected so as to have friction, since an inclination angle of the display part 3 to the hinge 8 is appropriately adjusted and held without returning to the state before inclination by the deadweight of the display part 3 even when the force of inclining the display part 3 is removed.

In order to shift from the state capable of imaging at a high angle to the state capable of self-imaging, the inclined state of the display part 3 is returned to the state before the inclination as illustrated in FIG. 10B first. Thus, the state of turning the display part 3 up to about 90° as illustrated in FIG. 2 is attained. Further, as illustrated in FIGS. 10C and 10D, by performing the turning operation of the display part 3 described with reference to FIGS. 2-5, the imaging device 1 is turned to the state capable of self-imaging.

Since the sliding contact part 7 of the display part 3 is brought into sliding contact with the protective part 4 by the turning operation of the display part 3, the display part 3 receives force from the protective part 4 in the sliding direction. When the turning operation of the display part 3 is completed, the sliding of the display part 3 is also completed.

As described above, in the imaging device according to the present technology, there is no need of intentionally sliding the display part even in the operation of shifting from an imaging state at a high angle to a self-imaging state.

As another embodiment of the imaging device according to the present technology, there is an embodiment in which a hinge is extendable. One example of the imaging device including the extendable hinge will be described below with reference to FIG. 11.

Figure 11:
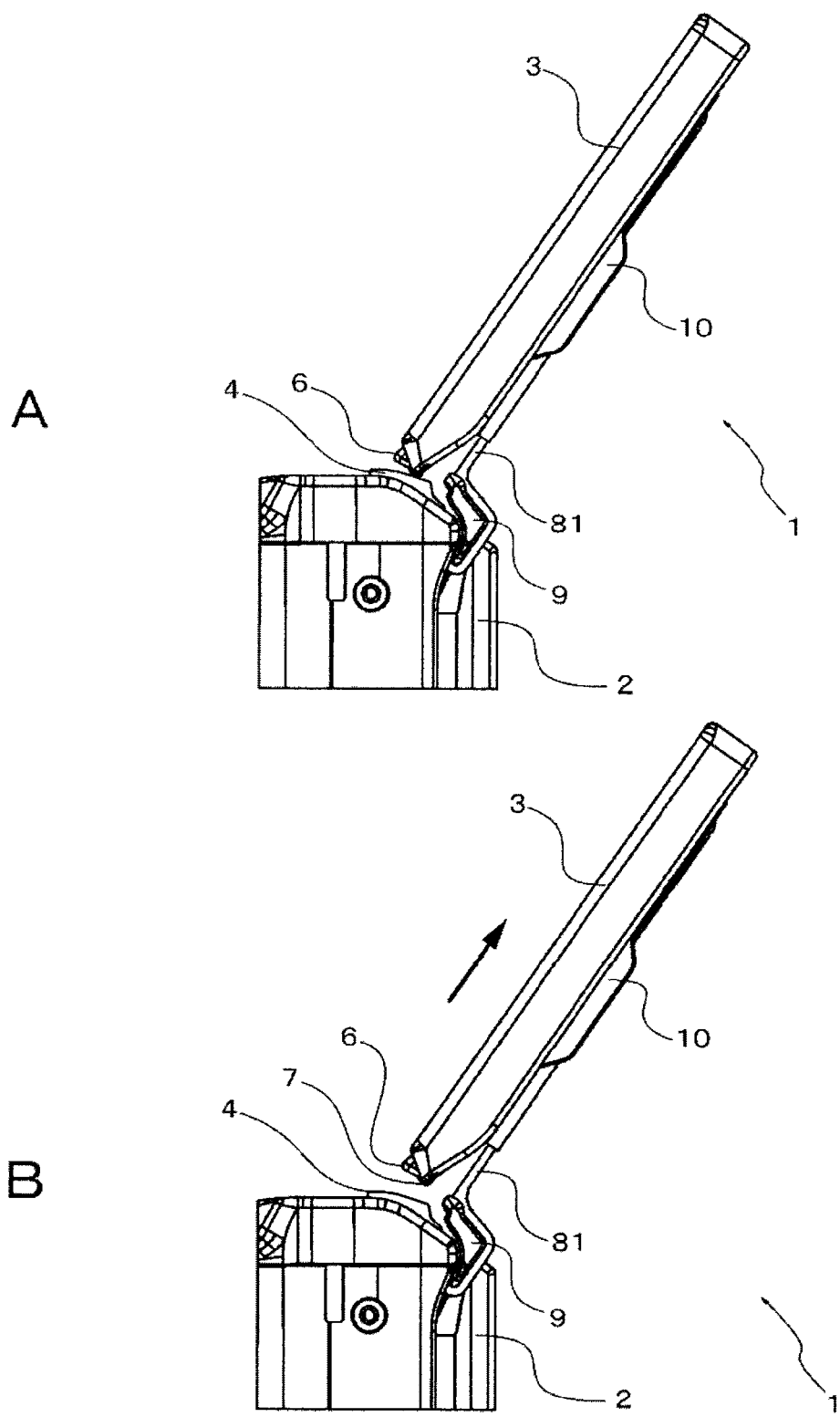
FIG. 11A is a partial enlarged view illustrating one example of the imaging device including an extendable hinge.
FIG. 11B is a partial enlarged view of a state that the display part in FIG. 11A is slid.

A hinge 81 illustrated in FIG. 11 is extendable. One end portion of the hinge 81 is connected to the imaging device body 2, and the other end portion is connected to the connection part 10 of the display part 3. Between one end portion and the other end portion of the hinge 81, a mechanism extendable in a direction orthogonal to the turning direction of the hinge 81 is provided. Also, for the extendable mechanism provided in the hinge 81, an appropriate elastic member, a member like the elastic member 18 illustrated in FIG. 6 for instance, can be used. It is preferable when the member used in the hinge 81 is the member which has to apply the force to the display part 3 against the elastic force in order to start sliding the display part 3 like the elastic member 18 illustrated in FIG. 6, since the display part 3 is not easily slid by some vibrations or the like.

FIG. 11A is a side view of the imaging device 1 in which the display part 3 starts to be slid in a direction orthogonal to the turning direction of the hinge 81, and FIG. 11B is a side view of the imaging device 1 in which the sliding of the display part 3 in the direction orthogonal to the turning direction of the hinge 81 is completed.

While FIG. 11B illustrates the state of intentionally sliding the display part 3, since the imaging device 1 includes the sliding contact part 7 in the display part 3 and the protective part 4 in the imaging device body 2, there is no need of intentionally sliding the display part 3 when shifting to the self-imaging state. That is, in the imaging device 1 including the hinge 81, when the display part 3 is turned, the force in the sliding direction of the display part 3 is made to act on the display part 3 by the sliding contact part 7 and the protective part 4, the hinge 81 is extended in the sliding direction of the display part 3, and thus the display part 3 is slid.

In the embodiments illustrated in FIGS. 1-11, the connection part 10 of the hinge 8 is provided on the almost center part in a short side direction of the display part 3, however, when there is no need for imaging at a high angle, the connection part 10 of the hinge 8 may be provided near the turning center of the hinge 8.

The embodiments of the present technology are concretely described above, however, the present technology is not limited to the embodiments described above and various kinds of alterations based on the technical ideas of the present technology are possible.

While a mirrorless interchangeable lens camera is described as an example in the embodiments illustrated in the drawings described above, the present technology is not limited to the example, and is also applicable to a so-called compact digital camera or the like when turning of the display part is necessary.

Also, for instance, configurations, methods, steps, shapes, materials and numerical values, etc., given in the embodiments described above are just examples, and configurations, methods, steps, shapes, materials and numerical values, etc., different from them may be adopted as appropriate as long as they do not depart from the point of the present technology.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An imaging device including:
an imaging device body;
a hinge connected to the imaging device body; and
a display part provided on the imaging device body slidably and turnably through the hinge.
(2) The imaging device according to (1), further including
a base body connected to one end side of the hinge,
wherein the display part is slid on the base body.
(3) The imaging device according to (1) or (2),
wherein the imaging device body further includes a protective part with which an end portion of the display part is to be in sliding contact when the display part is turned.
(4) The imaging device according to (3),
wherein the display part is slid on the base body by the end portion being in sliding contact with the protective part.
(5) The imaging device according to (3) or (4), wherein
the imaging device body has an inclined surface inclined with respect to an outer surface of the display part before being turned, and
the protective part is provided on the inclined surface.
(6) The imaging device according to any one of (1) to (5),
wherein a turning center of the hinge is uniaxial.
(7) The imaging device according to any one of (1) to (6), further including
a sandwiching part which sandwiches a shaft of the hinge so as to have friction.
(8) The imaging device according to any one of (3) to (5), further including
an abutting part to be abutted to an end face of the protective part.
(9) The imaging device according to any one of (1) to (8),
wherein the hinge is extendable.

The present disclosure contains subject matter related to that disclosed in Japanese Priority Patent Application JP 2012-186234 filed in the Japan Patent Office on Aug. 27, 2012, the entire content of which is hereby incorporated by reference.

What is claimed is:
1. An imaging device comprising:
an imaging device body;
a hinge connected to the imaging device body; and
a display part connected to the hinge, wherein
the display part, including a sliding contact part, is configured to rotate with respect to the imaging device body about the hinge, and
the imaging device body includes a protective part having a sliding surface being configured to contact with the sliding contact part, wherein the sliding contact part of the display part is in sliding contact with the sliding surface of the imaging device body when the display part rotates, and wherein the sliding surface is configured to slide the display part in a direction away from the hinge when the display part rotates beyond a predetermined angle with respect to the imaging device body.
2. The imaging device according to claim 1,
wherein the display part is slid on a base body by an end portion being in sliding contact with the protective part.
3. The imaging device according to claim 1, wherein
the imaging device body has an inclined surface inclined with respect to an outer surface of the display part in a first state, and
the protective part is provided on the inclined surface.
4. The imaging device according to claim 1,
wherein a rotation center of the hinge is uniaxial.
5. The imaging device according to claim 1, further comprising a sandwiching part which sandwiches a shaft of the hinge so as to have friction.

6. The imaging device according to claim 1, further comprising
an abutting part to be abutted to an end face of the protective part.

7. The imaging device according to claim 1,
wherein the hinge is extendable.

8. The imaging device according to claim 1,
wherein the shape of the display part is rectangular when viewed from a direction the imaging device body faces to receive light for imaging through a lens, and the hinge is connected to a long side of the display part.

9. The imaging device according to claim 8,
wherein the display part is configured to rotate about the long side of the display part as a rotation axis.

10. The imaging device according to claim 1,
wherein the display part is configured to rotate via the hinge about 180 degrees.

11. The imaging device according to claim 1,
wherein the display part is configured to operate in both of a first state and a second state.

12. The imaging device according to claim 1,
wherein the hinge is connected to the imaging device body directly.

13. The imaging device according to claim 1,
wherein the protective part protrudes from the imaging device body.

14. The imaging device according to claim 1,
wherein the protective part limits a rotation angle of the display part via the hinge to about 180 degrees.

15. An imaging device comprising:
an imaging device body;
a hinge connected to the imaging device body; and
a display part connected to the imaging device body, wherein
the display part is configured to rotate with respect to the imaging device body about the hinge, and
the imaging device body includes a protective part having a sliding surface being configured to contact with the sliding contact part, wherein the sliding contact part of the display part is in sliding contact with the sliding surface of the imaging device body when the display part rotates, and wherein the sliding surface is configured to slide the display part in a direction away from the hinge when the display part rotates beyond a predetermined angle with respect to the imaging device body.

16. The imaging device according to claim 15, further comprising a base body connected to the imaging device body,
wherein the display part is connected to the imaging device body via the hinge, the base body is connected to the imaging device body via the hinge, and the display part is configured to rotate via the hinge.

17. The imaging device according to claim 1, further comprising:
a base body connected to the hinge;
a slit formed on the base body; and
a projection part, which is disposed inside the display part, configured to slide inside the slit.

18. The imaging device according to claim 17, wherein a length in a long axial direction of the slit determines a slidable range of the display part.

19. The imaging device body according to claim 1, wherein the protective part, with which an end portion of the display part is to be in sliding contact, is non-movable, when the display part is moved away from the imaging device body.

* * * * *